March 19, 1935.   L. S. ROSENER   1,995,014
COUPLING
Filed May 13, 1930
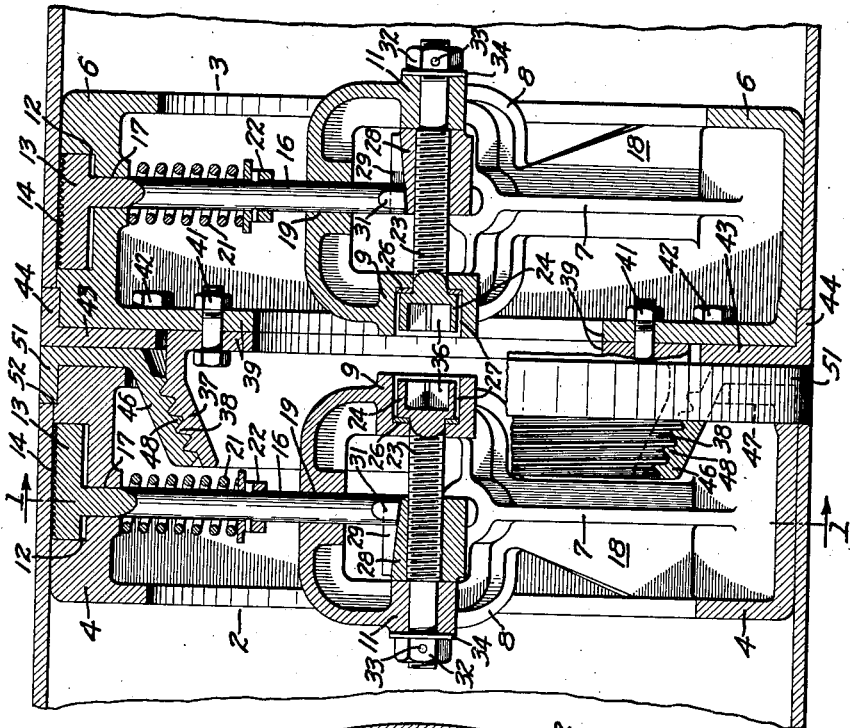
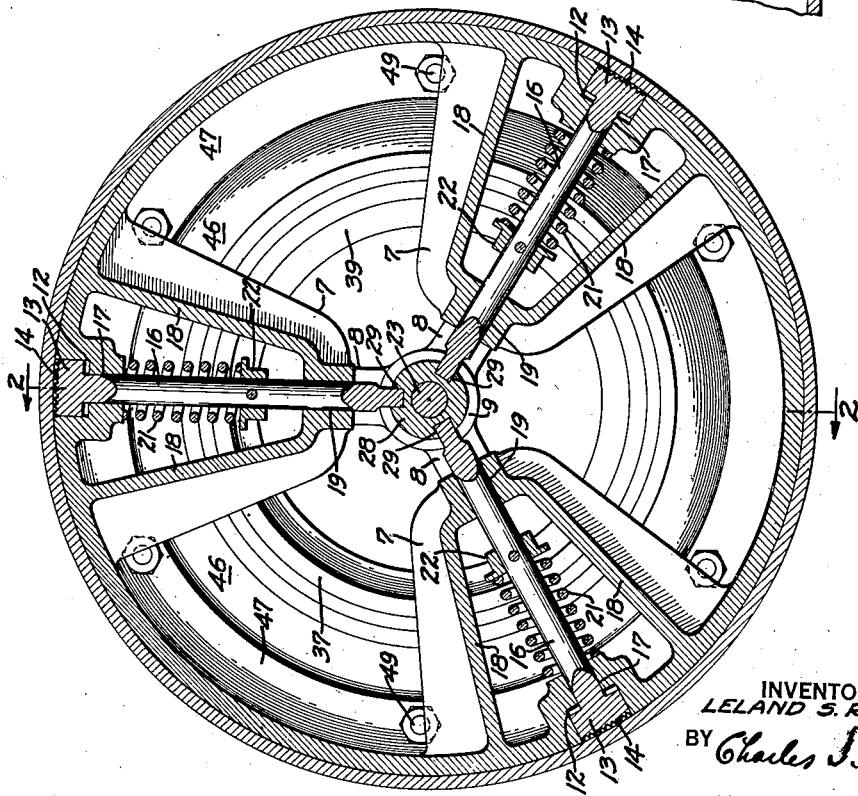
INVENTOR
LELAND S. ROSENER
BY Charles J. Evans
HIS ATTORNEY Patented Mar. 19, 1935

1,995,014

UNITED STATES PATENT OFFICE 1,995,014

COUPLING

Leland S. Rosener, San Francisco, Calif., assignor to The Paraffine Companies, Inc., San Francisco, Calif., a corporation of Delaware Application May 13, 1930, Serial No. 451,953

5 Claims. (Cl. 285—1)

My invention relates to a coupling, and particularly to a coupling for securing pipes together while being wrapped in a pipe wrapping machine.

It is among the objects of the invention to provide a pipe coupling which will give continuous operation to a pipe wrapping machine that formerly had to be stopped after each pipe section had been wrapped.

Further objects of the invention include the provision, in a coupling of the character described, of quick acting means for clamping the coupling to a pipe; and means, operated by relative rotation between the pipes, for optionally coupling together or uncoupling the pipes.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a transverse vertical sectional view of a coupling embodying my invention taken in a plane indicated by the line 1—1 of Figure 2; and Figure 2 is a longitudinal vertical sectional view of the same taken in a plane indicated by the line 2—2 of Figure 1.

In the practice of wrapping sections of pipes in a pipe wrapping machine, it has been necessary to stop the machine at periodic intervals to replace the wrapped pipe section with a new section to be wrapped. It is apparent that this operation involves considerable loss of time when many pipes are being wrapped. It is the purpose of this invention to preclude such waste of time; and the herein disclosed coupling affords means for giving continuous operation to a pipe wrapping machine in which individual sections of pipes are being wrapped.

In broadly descriptive terms the invention comprises a pair of cooperating coupling frames or plugs, having quick acting clamping mechanisms for securing the plugs to the ends of the pipes which are wrapped by a pipe wrapping machine. Also, means, preferably effected by relative rotation between the pipes, is provided for optionally coupling together or uncoupling the plugs.

In greater detail, the invention comprises the hollow cylindrically shaped frames or plugs 2 and 3, having the rims 4 and 6 respectively. The rim 4 of plug 2, and the rim 6 of plug 3, each has an outside diameter which is slightly smaller than the inside diameters of the pipes with which the coupling is to be used, so that the plugs may be inserted in the ends thereof. The plugs 2 and 3 have integrally formed on their rims the internally extending ribbed U-shaped spokes 7; at the ends of which are provided the yokes 8, having the common hub parts 9 and 11 whose axes coincide with the axes of the plugs. Preferably there are three of these U-shaped spokes equally spaced within each plug.

In order that the plugs may be quickly secured in the ends of the pipes, quick acting clamping mechanisms are provided. Seated in the recesses 12, in the faces of rims 4 and 6, are the clamping jaws 13 having the gripping surfaces 14. There are preferably three of these jaws equally spaced about the peripheries of each plug. The clamping jaws are provided with the internally extending shanks 16, adapted to pass inwardly through the rim apertures 17 in such a manner that they are spaced between the arms 18 of the U-shaped spokes 7. The spoke yokes 8 are provided with suitable apertures 19 for supporting the inner ends of the shanks 16 which pass therethrough. It is desirable to normally retain the clamping heads 13 within the recesses 12, and to accomplish this, a spring 21 is disposed about shanks 16 and compressed between the plug rims and the shank collars 22.

Means are provided for moving the shanks 16 radially outward to force the clamping heads against the inside of a pipe, and thereby lock the plug to the pipe; and to insure an equal gripping of the clamping heads, the shanks of each coupling portion preferably have a common moving means. An adjusting screw 23, journaled in hub parts 9 and 11, has a turning head 24 which bears against the bushing washer 26 and seats in the recess 27 of hub part 9. The portion of the screw between the hub parts is threaded to receive a cylindrical adjusting nut 28, having the inclined bottomed grooves 29 formed in its periphery adapted to receive the flattened ends 31 of the clamping head shanks; the adjusting nut 28 being, in effect, a conical nut. The free end of the adjusting screw has a lock nut 32 threaded thereon and fixed by the pin 33; and a bushing washer 34 provides bearing surfaces between lock nut and hub part 11.

After a plug has been placed in the end of a pipe, a suitable tool is inserted in the squared recess 36, provided in the turning head 24 of the adjusting screw 23, and the screw rotated. When the adjusting nut 28 is adjacent the hub part 11, the clamping jaws are held within the recesses 12 by the spring 21; however, when the adjusting nut is moved away from hub part 11, due to the rotation of the adjusting screw, the shanks 16 will be moved outward simultaneously because of the adverse slope of the inclined bottomed grooves 29. Consequently, the clamping heads 13 will be forced against the inside surface of the pipe, and the gripping action of these heads will securely lock the plug to the pipe.

Turning the adjusting screw in the opposite direction to that which was required to move the clamping heads outward, will move the adjusting nut 28 back towards hub part 11 and allow the clamping heads to recede back into recesses 12; hence, the clamping means are released and the plugs conditioned for removal from the pipes. It is to be noted that the common moving means for the clamping mechanism not only insures equal gripping of the spaced clamping heads and consequent centering of the plug, but also makes the clamping mechanism quick acting due to its dependency on a single adjustment.

When a section of pipe is being advanced through and rotated by a wrapping machine, it is desirable, in order to make the operation continuous, to secure a new section of pipe to the one in the machine and detach the first mentioned section after it is wrapped and is leaving the machine. The coupling herein disclosed provides means for doing this. An outwardly extending conical element or stud 37, having the threads 38 formed on the outer conic surface thereof, which are preferably standard double threads, is secured to the plug 3 through the abutting flanges 39 by means of suitable bolts 41.

Surrounding the stud 37, and secured to the plug 3 by suitable bolts 42, is a ring 43 having a flange 44 which projects over the rim of the plug. The projected portion of the flange extends above the surface of the rim an amount substantially equal to the thickness of the pipe with which the coupling is to be used, and serves as an abutment for the pipe. It is to be noted that the periphery of the flange is flush with the periphery of the pipe, so that the outer surfaces of the flange and pipe provide a substantially continuous surface.

The plug 2 has an element adapted to cooperate with the stud 37 of plug 3; and to this end the inwardly extending conical socket 46 is provided, secured to the plug flange 47 by means of suitable bolts 49. This socket is engageable with the stud 37, and has the internally extending threads 48 formed on the inner conic surface thereof; which threads are complementary to the threads on the stud and are adapted to register therewith. The socket 46 is provided with a flange 51 which seats in the annular recess 52 formed on the inner edge of the periphery of rim 4, and extends above the surface of the rim to provide an abutment for a pipe as did flange 43 heretofore described in connection with the plug 3.

When a section of pipe having the plug 3 secured in an end thereof is being rotated clockwise, as viewed from the left in Figure 2, in a machine, another section having the plug 2 secured therein is brought up end to end with the first mentioned section so that the plugs are adjacent. The threads 48 will then engage with threads 38, and, due to the rotation of plug 3 by the pipe in the machine, the plugs will be screwed together until the face flange of socket 46 abuts against the ring 43; thus coupling the pipe sections together.

After the first mentioned section has passed out of the machine, and the second section is being positively rotated thereby, the turning action of the second section will unscrew the first mentioned section therefrom. Thus it is seen that the process of securing together and taking apart sections of pipes, as they enter and pass out of a machine in which one section is being positively rotated to effect relation rotation between the pipes, is made a continuous and substantially automatic operation. It is obvious that the plugs may be made of any size to accommodate various sizes of pipes.

The coupling may be used in connection with any pipe wrapping machine in which pipes are rotated and advanced through the machine, and, since the majority of pipe wrapping machines involve this combined movement of translation and rotation, the device has an extended usage. It is to be noted that the plug portions serve to continue the outer surface of the pipes, and hence do not obstruct the operation of the machine.

Of course it will be necessary to cut the wrapping between the wrapped pipe section and the section being wrapped, so that the first mentioned section may be detached. This feature however does not fall within the scope of this invention; suffice to say that it may be accomplished by any one of a number of rotary cutters now being used in connection with pipe wrapping machines.

By providing suitable carriages, such as traveling belts, for conveying the pipes to and from the machine, and providing guides for directing the pipes, the manual labor involved may be reduced to merely inserting and detaching the plugs. This, together with the fact that the clamping mechanisms are quick acting, reduces the time and labor involved in the operation to a minimum.

I claim:

1. In a coupling for temporarily securing together sections of a pipe, a frame adapted to loosely engage the inside of the pipe, circumferentially disposed spring-pressed jaws mounted on the frame, and means for actuating said jaws.

2. In a coupling for temporarily securing together sections of a pipe, a frame adapted to loosely engage the inside of the pipe, jaws for engaging the pipe arranged about the frame, a radially disposed shank upon which each jaw is mounted, springs encircling the shanks for urging the same inwardly, and means for simultaneously extending the shanks.

3. In a coupling for temporarily securing together sections of a pipe, a frame adapted to loosely engage the inside of the pipe, jaws for engaging the pipe arranged about the frame, a radially disposed spring-pressed shank upon which each jaw is mounted, and screw-operated means for extending the shanks.

4. In a coupling for temporarily securing together sections of a pipe, a frame adapted to loosely engage the pipe, jaws for engaging the pipe arranged about the frame, a radially disposed shank upon which each jaw is mounted, a screw journaled in the frame, a conical nut threaded on the screw and bearing on the inner portions of the shanks for extending or retracting the shanks by rotation of the screw, and resilient means for urging the shank against the nut.

5. In a coupling for temporarily securing together pipe sections, a pair of plugs adapted to loosely engage the pipes, spring-pressed means disposed on the plugs for engaging the inner surface of the pipes, means for actuating said engaging means, and means for coupling the plugs together.

LELAND S. ROSENER.